(12) United States Patent
Gao et al.

(10) Patent No.: US 8,411,135 B2
(45) Date of Patent: Apr. 2, 2013

(54) METHODS TO ELIMINATE/REDUCE THE CROSSTALK ARTIFACTS OF THE RETRO-REFLECTIVE AUTO-STEREOSCOPIC 3D DISPLAY

(75) Inventors: Chunyu Gao, Santa Clara, CA (US); Jing Xiao, Cupertino, CA (US)

(73) Assignee: Seiko Epson Corporation, Tokoy (JP)

( * ) Notice: Subject to any disclaimer, the term of this patent is extended or adjusted under 35 U.S.C. 154(b) by 529 days.

(21) Appl. No.: 12/725,636

(22) Filed: Mar. 17, 2010

(65) Prior Publication Data
US 2011/0228054 A1  Sep. 22, 2011

(51) Int. Cl.
*H04N 7/12*  (2006.01)

(52) U.S. Cl. ............. 348/51; 348/42; 348/52; 348/54; 348/55

(58) Field of Classification Search .......... 348/42, 348/51, 52, 54, 55
See application file for complete search history.

(56) References Cited

U.S. PATENT DOCUMENTS

| | | | |
|---|---|---|---|
| 4,676,613 A * | 6/1987 | Collender | 352/58 |
| 6,213,606 B1 * | 4/2001 | Holman et al. | 353/20 |
| 6,323,999 B1 * | 11/2001 | Ueda et al. | 359/443 |
| 6,831,678 B1 | 12/2004 | Travis | |
| 7,119,965 B1 | 10/2006 | Rolland et al. | |
| 7,180,663 B2 * | 2/2007 | Collender et al. | 359/451 |
| 7,643,025 B2 | 1/2010 | Lange | |

* cited by examiner

*Primary Examiner* — Sath V Perungavoor
*Assistant Examiner* — Geepy Pe

(57) ABSTRACT

Crosstalk artifacts in a retro-reflective auto-stereoscopic 3D display system are compensated by providing various methods of directing surface reflections of a screen away from a viewing region, i.e. a region from which the screen is viewed. This is achieved by splitting the screen in two, and tilting the left-side and right-side of the screen either towards, or away, from a projection baseline so as to direct mirror reflections away from the viewing region. Alternatively, the screen is not split, but vertical v-shaped grooves are made along the surface of the screen facing the projection line. The angle of the v-shaped grooves direct surface reflections away from the viewing region, but the grooves are substantially small so that the screen appears flat to an observer.

12 Claims, 16 Drawing Sheets

METHODS TO ELIMINATE/REDUCE THE CROSSTALK ARTIFACTS OF THE RETRO-REFLECTIVE AUTO-STEREOSCOPIC 3D DISPLAY

BACKGROUND

1. Field of Invention

The present invention pertains generally to autostereoscopic three-dimensional (3D) displays, and relates more particularly to methods and structures for reducing crosstalk between viewing windows.

2. Description of Related Art

Traditionally, stereoscopic, i.e. 3D, images are created by aid of headgear that control viewing of separate left and right stereoscopic images by the left and right eyes, respectively, of a viewer. Each of the left and right images displays the same scene from slightly shifted viewing angles that closely match the viewing angles of a viewer's eyes. By conveying the separate left and right images to the viewers left and right eyes with viewing angles closely matching each eye's normal viewing angle, an illusion of a 3-Dimensional, i.e. 3D, display is created for the viewer.

Although this approach is effective, the required headgear (such as head-mounted displays or glasses with specialized lenses for rejecting specific angle views) makes this approach cumbersome. An alternative to using headgear is to use autostereoscopic displays, i.e. specialized displays that display select images at specific view angles such that only by viewing the display at a specific view angle can one view a select image. Theses specific view angles are typically termed "viewing windows".

Autostereoscopic displays use special light directing devices to create separate viewing windows in the user's space, which allow the user to see 3D images without glasses. Since the designated viewing windows form a viewing space that is significantly larger than the size of the human eye, users can move their heads freely as long as their eyes are within the viewing space.

Current stereoscopic methods used to produce the viewing windows include parallel-barrier-based displays and lenticular-based displays.

Parallel-barrier displays use light blocking to produce viewing windows, but this approach results in a dimmer image since only a small amount of light emitted from each pixel passes through the barrier window. Overlap of viewing areas causes crosstalk causing one eye to see the image intended for the other eye. When crosstalk is significant, one cannot perceive the stereo effect or cannot perceive it correctly. Parallel-barrier displays also use small apertures that can cause diffraction, particularly as the display resolution is increased. As the display resolution increases, the barrier aperture size is decreased, which causes more severe diffraction effects. Parallel-barrier displays divide the resolution of the original display by the number of views such that to display n views, the resolution of the individual view becomes 1/n of the original display resolution. Parallel-barrier displays suffer from dark pixel lines due to each view seeing only one pixel column out of n associated with one barrier window.

Lenticular-based displays offer some improvements over parallel-barrier-based displays. Lenticular-based displays offer higher resolution compared with the barrier slits of parallel-barrier-based displays, but they are generally more difficult and costly to make due to the need for high quality lenticular sheets. Generally, the quality of the lenticular-based display is directly related to the quality of the lenticular sheet used in the display. Aligning a lenticular sheet with a display also requires significant effort. Although lenticular-based displays offer benefits over parallel-barrier-based displays, lenticular-based displays also suffer from crosstalk between view windows, dark line problem, limited resolution, and limit number of viewing windows.

Another solution is to use retro-reflective, multi-view 3D displays, which use projectors to create multiple viewing windows. These displays create distinct view windows by means of special reflective properties of the display. However, these displays typically have a limited view view-area, which limits the area in which the 3D effect can be perceived. Another limitation of typical retro-reflective displays is that they do not lend themselves to the creation of wide-view-screen displays.

SUMMARY OF INVENTION

It is an object of the present invention to provide a screen system and screen capable of improving a viewing experience by eliminating crosstalk effects between adjacent projectors.

This object is achieved in a screen system having: a plurality of projectors, each configured to project a unique image; a screen having a front surface and a back surface, with the front surface facing the plurality of projectors; a viewing region defined in an area substantially along a line normal from the projectors to the screen; wherein the screen is divided into a left plane and a right plane, the left and right planes being angled at a junction joining the left plane to the right plane, the angle being sufficient for directing a mirror reflection on the left and right planes, of the unique images from the projectors, away from the viewing region.

In this system, the screen is a retro-reflective vertical light diffusion screen. The screen includes a substrate with a retro-reflective material layer on one surface and a one-dimensional light diffusion material layer on its opposite surface, the surface having the one-dimensional light diffusion material layer being the front surface of the screen.

Also in this system, the left and right planes are angled away from the projectors so that the junction is the part of the screen closes to the projectors, the left and right planes forming a first target angle, θ, with reference to a first reference line perpendicular to a second reference line normal to the projectors traversing the junction, the first target angle being not less than $$\theta = \tan\left(\frac{L}{2Z}\right)$$

wherein the plurality of projectors are arranged in a series of adjacent projectors, L is the length of a projection baseline defined by the physical length from the first lens of the first projector within the series of adjacent projectors the last lens of the last projector within the series of adjacent projectors, and Z is the normal distance from the junction to the series of adjacent projectors. Preferably, the first target angle θ is $$\theta = \tan\left(\frac{L}{2Z}\right).$$

Alternatively, the left and right planes are angled toward the projectors so that the junction is the part of the screen farthest from the projectors, the left and right planes forming a second target angle, φ, with reference to a first reference line perpendicular to a second reference line normal to the projectors traversing the junction, the second target angle being not less than $$\phi = \tan\left(\frac{L+W}{2Z}\right)$$

wherein the plurality of projectors are arranged in a series of adjacent projectors, L is the length of a projection baseline defined by the physical length from the first lens of the first projector within the series of adjacent projectors the last lense of the last projector within the series of adjacent projectors, Z is the normal distance from the junction to the series of adjacent projectors, and W is the span from the far-end of the left plane with reference to the junction to the far-end of the right plane with reference to the junction. In this case, it is preferred that the second target angle $\phi$ be $$\phi = \tan\left(\frac{L+W}{2Z}\right).$$

In the above screen system, it is preferred that the left and right planes are of equal width. Further preferably, screen is divided in half to form the left plane and the right plane.

In a further enhancement, the plurality of projectors are arranged in multiple tiers with adjacent projectors being on neighboring tiers, and the lens aperture of adjacent projectors on neighboring tiers being offset so that a first edge of the aperture of each projector aligns with the corresponding opposite edge of the aperture of its adjacent projector.

The present object is also met in a screen having: a substrate with a back surface and a front surface, the front surface having a series of v-shaped grooves along a vertical direction; a retro-reflective material layer on the back surface of the substrate; and a one-dimensional light diffusion material on the front surface of the substrate, including within the v-shaped grooves so that the one-dimensional light diffusion material forms v-shaped grooves that follow the v-shaped grooves of the substrate. It is to be understood that the substrate is made of a transparent material. Also preferably, the one-dimensional light diffusion material is a vertical light diffusion material.

In the present case, the series of v-shaped grooves are arranged adjacent each other, each groove abutting the next, and the v-shaped grooves span the entire width of the substrate. Similarly, the v-shaped grooves extend the entire vertical length of the substrate.

It is presently preferred that the two facing panels of each v-shaped groove form a 90 degree angle between them.

In this embodiment, the back surface of the substrate is substantially flat.

The present object is also met in a screen system having: a screen as recited immediately above; a plurality of projectors facing the front surface of the substrate, each projector within the plurality of projectors configured to project a unique image. In this screen system, a viewing region is defined in an area substantially along a line normal from the projectors to the front surface of the substrate, and the two facing panels of each v-shaped groove form an angle between them that is sufficient for directing a mirror reflection on the facing panels, of the unique images from the projectors, away from the viewing region.

The present object is also met in a screen system having a plurality of projectors, each configured to project a unique image; a screen having a front surface and a back surface, with the front surface facing the plurality of projectors; wherein the plurality of projectors are arranged in multiple tiers with adjacent projectors being on neighboring tiers, and the lens aperture of adjacent projectors on neighboring tiers being offset so that a first edge of the aperture of each projector aligns with the corresponding opposite edge of the aperture of its adjacent projector. In one case, the projectors are arranged in two tiers in a zig-zag arrangement. In another case, the projectors are arranged in more than two tiers.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

The presently preferred embodiment makes use of a retro-reflective vertical light diffusion screen. Such a screen is typically comprised of two layers: a first layer of a one-dimensional (1D) light diffusion material (which has a small diffusion angle in one direction and a large diffusion angle in another direction) and a second layer of a retro-reflective material (which reflects light rays back at their respective incident angle).

Figure 1:
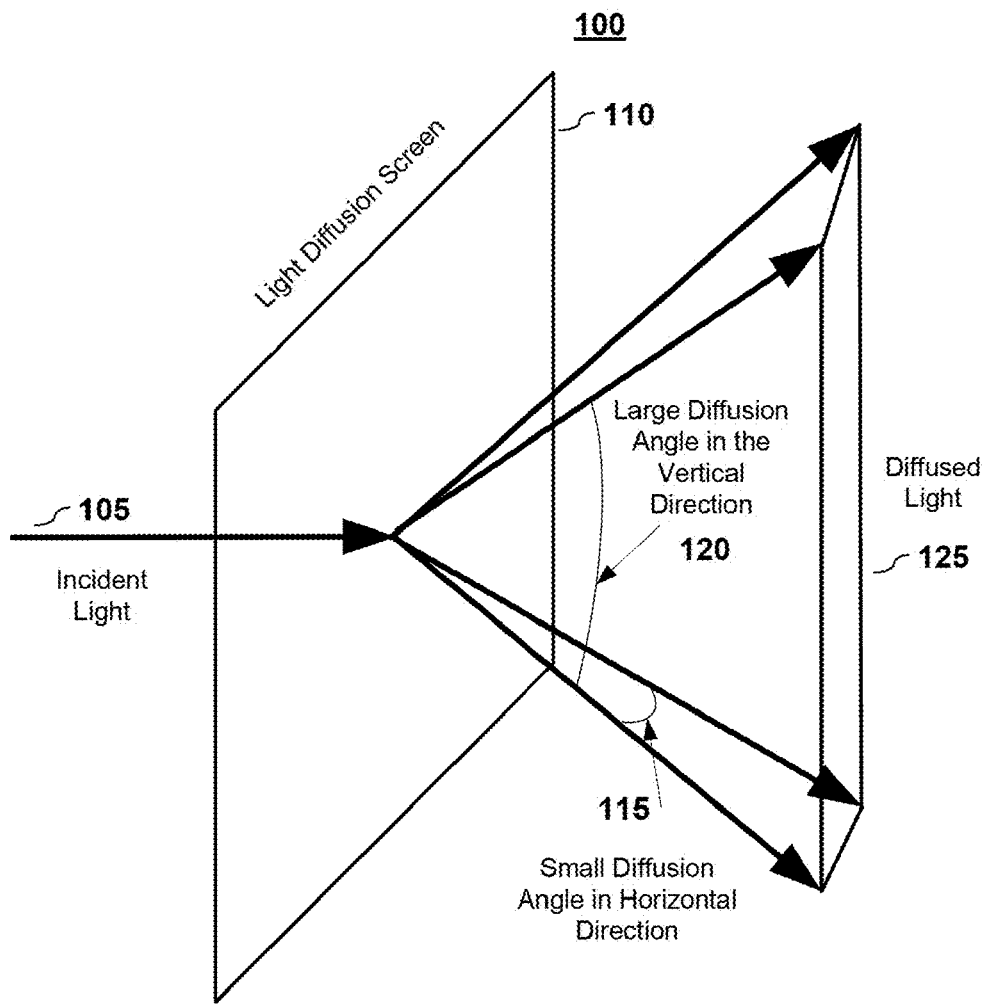
FIG. 1 illustrates the operation of a light diffusion screen.

With reference to FIG. 1, the first layer 100 consists of a light diffusing material 110. An incident light ray 105 that passes through light diffusing material 110 is diffused by a small angle 115 in the horizontal direction and diffused by a large angle 120 in the vertical direction. This creates a diffused light window 125. This type of diffusion screen can be referred to as a vertical light diffusion screen.

Figure 2:
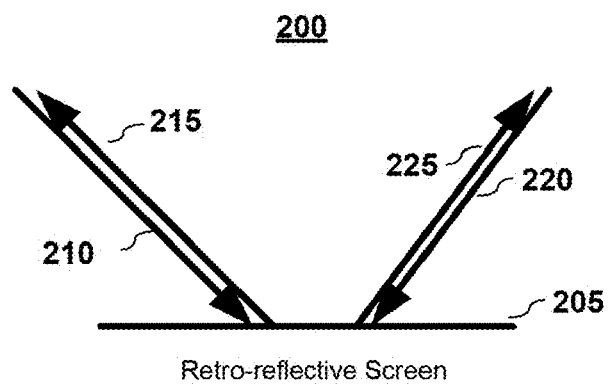
FIG. 2 illustrates the operation of a retro-reflective screen.

With reference to FIG. 2, the second layer of the retro-reflective vertical light diffusion screen includes a retro-reflective material 205. When an incident light ray, such as light rays 210 or 220, strikes retro-reflective material 205, it is reflected back at the same, or nearly the same, angle as its incident angle. For example, incident light ray 210 has a retro-reflective ray 215 that is reflected back along the direction (i.e. incident angle) of incident ray 210. Similarly, incident light ray 220 has a retro-reflective ray 225 that is reflected back along the direction of the incident ray 220.

Figure 3:
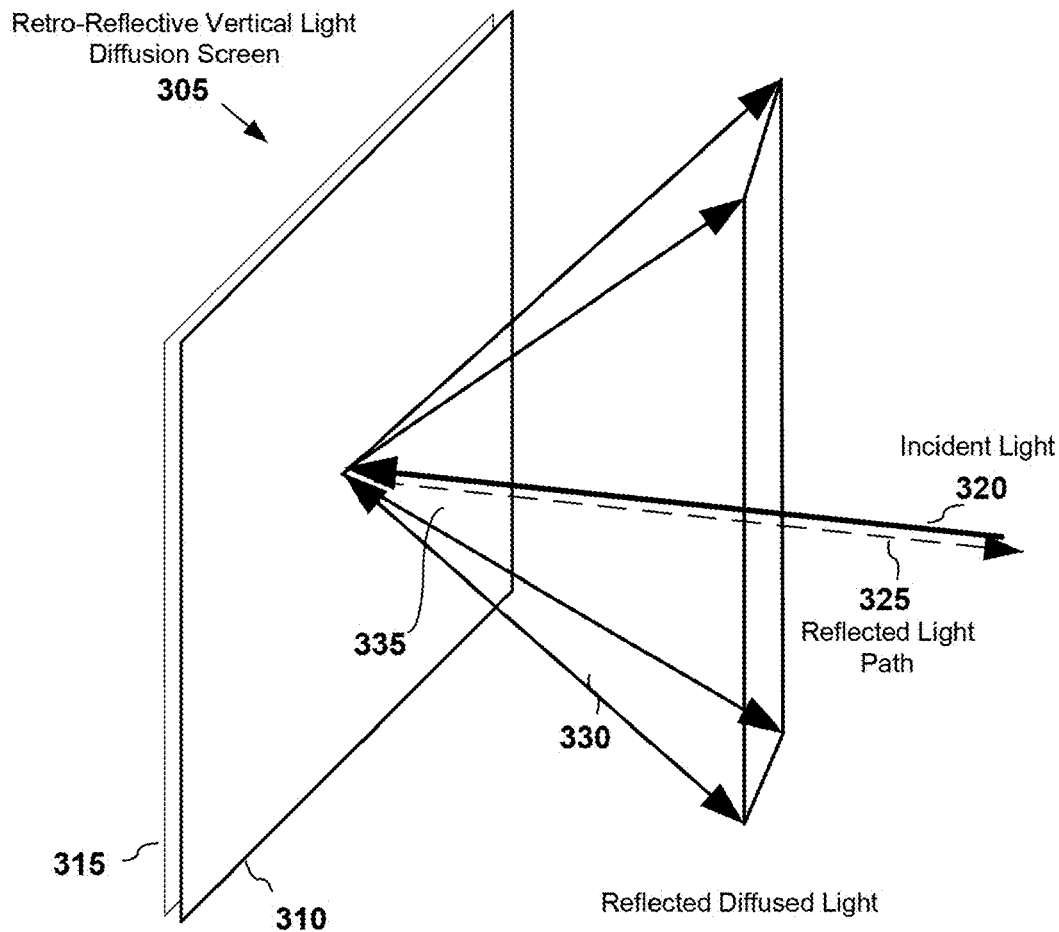
FIG. 3 illustrates the operation of a retro-reflective vertical light diffusion screen according to the present invention.

With reference to FIG. 3, a retro-reflective vertical light diffusion screen 305 is preferably formed of a one-dimensional light diffusion material 310 combined with a retro-reflective material 315. An example of a one-dimensional light diffusion material is Light Shaping Diffusers (LSD®) produced by Luminit LLC of Torrance, Calif. A light shaping diffusion material may have diffusion angles of 60°×1°, although one skilled in the art shall recognize that other diffusion angles may be used. Preferably, retro-reflective material 315 has a 60° diffusion angle in the vertical direction and a 1° diffusion angle in the horizontal direction. Examples of a retro-reflective material is 3M™ Scotchlite™ Reflective Material, produced by 3M Corporation of St. Paul, Minn., or photoelectric control products, such as P66 and AC1000 with metalized back produced by Reflexite Americas of New Britain, Conn.

As depicted in FIG. 3, in a system 300 in accord with the present invention, a light ray 320 directed toward the retro-reflective vertical light diffusion screen 305 passes through one-dimensional light diffusion material 310 and is reflected back along its incident direction 325 (or substantially along its incident direction) by retro-reflective material 315. One-dimensional light diffusion material 310 diffuses the retro-reflected light by a small amount in the horizontal direction 330 and by a large amount in the vertical direction 335.

Figure 4:
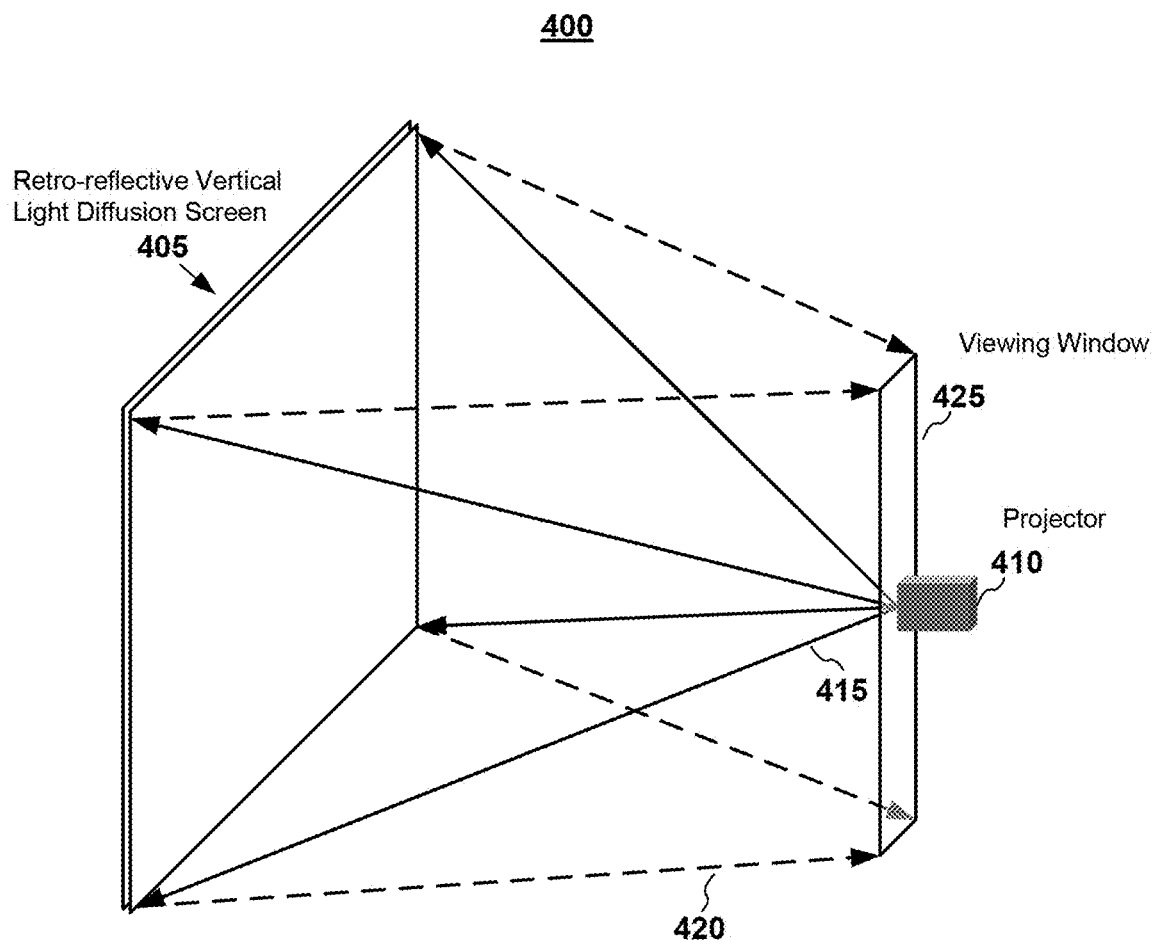
FIG. 4 illustrates a display system with a retro-reflective vertical light diffusion screen according to the present invention.

With reference to FIG. 4, a fundamental display system 400 in accord with the present invention includes a retro-reflective vertical light diffusion screen 405 and a projector 410. The retro-reflective vertical light diffusion screen 405 is used as a display screen. Light rays 415 emitted from projector 410 are retro-reflected back to the projector 410 and create a viewing window 425, which overlaps with projector 410. The screen 405 is configured such that the reflected light is diffused with a large diffusion angle in the vertical direction and with a small diffusion angle in the horizontal direction. Due to the vertical diffusion effect, the viewing window is a vertical slit, or viewing window, 425 centered with the aperture of the projection lens. The width of the viewing windows 425 is a function of the horizontal diffusion angle of screen 405, the distance from projector 410 to screen 405, and the aperture size of the projection lens. The width of viewing window 425 may be determined according to the following calculation:

$$W = D_a + 2 \cdot Z_p \cdot \tan\left(\frac{\omega}{2}\right),$$

where
  W is the width of the slit;
  $D_a$ is the aperture size of the projection lens;
  $Z_p$ is the distance from the projector to the screen; and
  $\omega$ is the horizontal diffusion angle of the screen.

It is noted that an advantage of having a large vertical diffusion angle is that the viewing window is extended vertically. Without a vertically extended viewing window, the viewing window 425 might coincide with the projector lens, thereby making it not possible for an individual to view the reflected image within viewing window 425. By extending the viewing window in a vertical direction, a user can view the image in viewing window 425 by viewing from a position either above or below projector 410. It is further noted that the reflected image does not appear stretched or distorted within viewing window 425. Viewing window 425 acts like slit, or opening in an otherwise opaque surface, through which a viewer may see screen 405 in its entirety. Viewing window 425 may be likened to an opening between the boards of a privacy fence through which all of screen 405 is visible.

Figure 5:
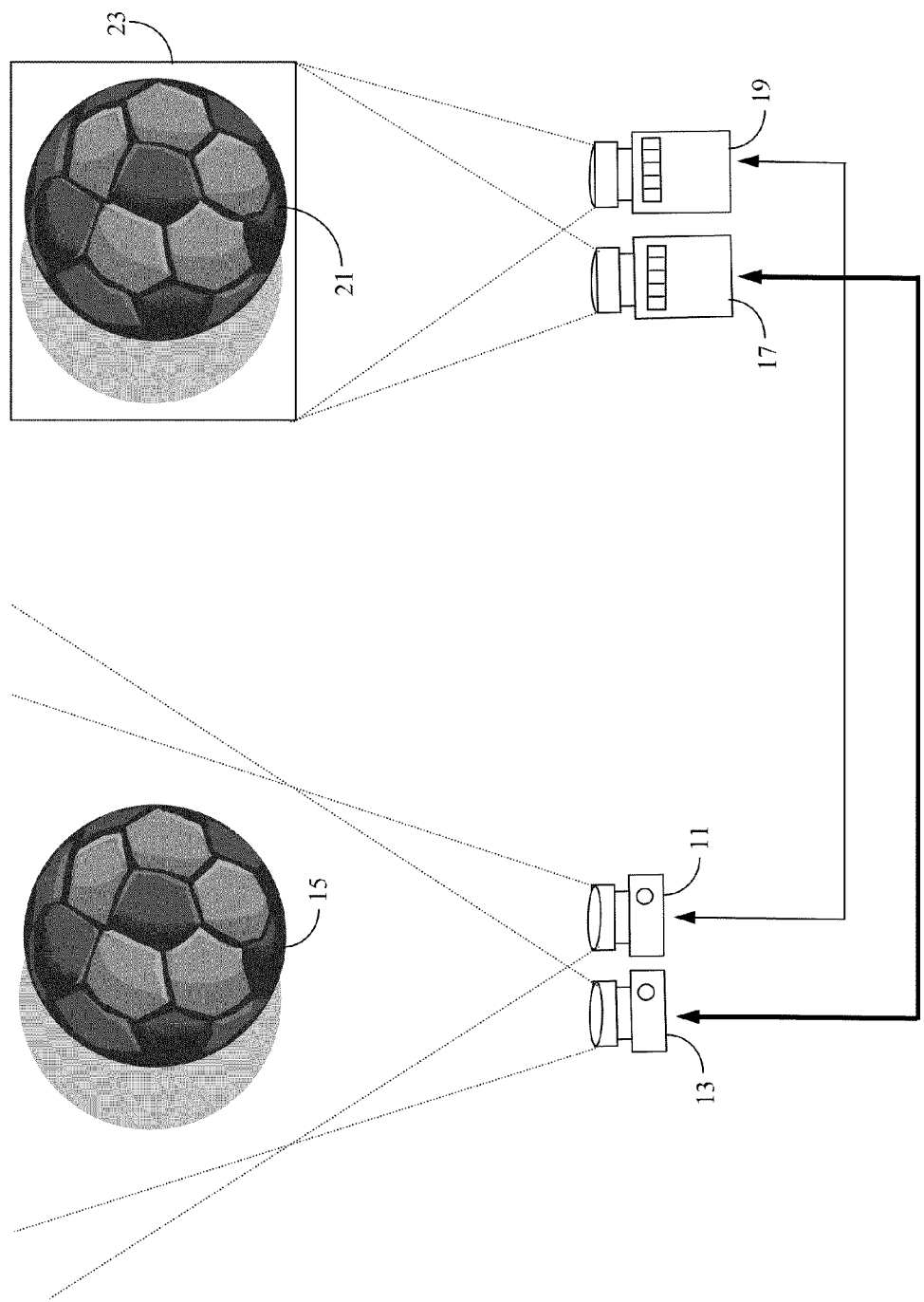
FIG. 5 show a system for creating a stereoscopic image of a subject by using two cameras to take two images of a common scene from two slightly different view angles.

With reference to FIG. 5, a stereoscopic image of a subject 15 may be created by using two cameras 11 and 13 to make two respective images of a common scene from two slightly different view angles. In other words, by placing cameras 11 and 13 adjacent each other with a separation similar to the separation between human eyes, cameras 11 and 13 can create images as viewed individually by a human's left eye and right eye. The separation of human eyes is typically within a range of 52 mm to 78 mm. Thus, by placing a separation of 52 mm to 78 mm between the capture lenses of cameras 11 and 13, a stereoscopic view may be made.

In the present example, cameras 11 and 13 are used to create respective images of a common subject, i.e. soccer ball 515. It is to be understood that cameras 11 and 13 may be still picture cameras or moving picture cameras (i.e. video cameras). Cameras 11 and 13 may further be embodied by a single 3-D camera enclosure.

A stereoscopic image 21 can then be created by using two projectors 17 and 19 to project image 21 onto a screen 23. In the present example, projector 17 projects the left-eye image created by camera 13, and projector 19 projects the right-eye image created by camera 11.

An issue remaining to be addressed is how to assure that the image projected by projector 17 is received by a viewer's left eye and not by his right eye, and how to assure that the image projected by projector 19 is received by the viewer's right eye and not his left eye. In the presently preferred embodiment, this is achieved by having screen 23 be a retro-reflective vertical light diffusion screen, and thereby creating a retro-reflective vertical light diffusion display system.

Figure 6:
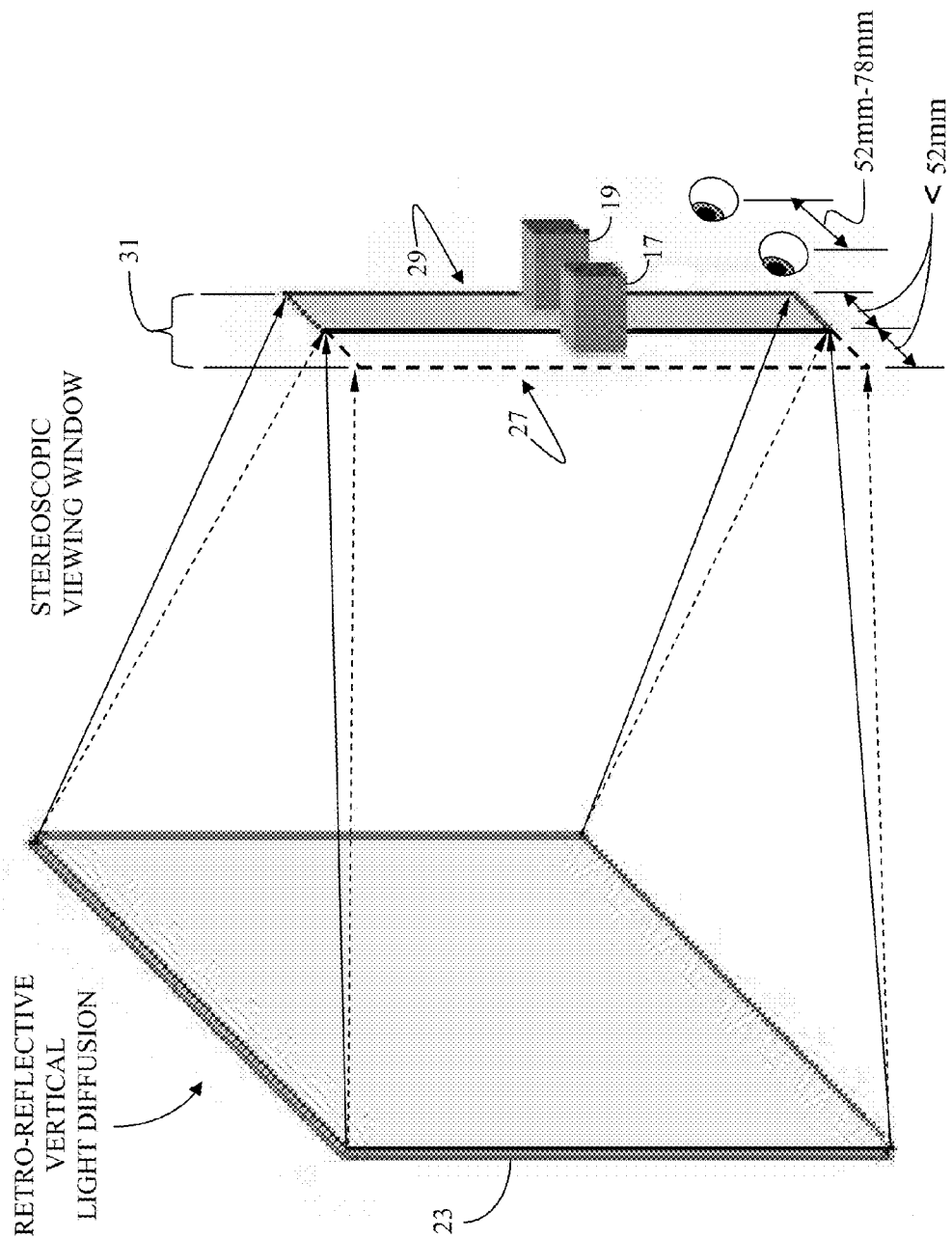
FIG. 6 is an example of a retro-reflective vertical light diffusion display system in accord with the present invention using two projectors to project a respective left-eye image and a right-eye image onto retro-reflective vertical light diffusion screen.

With reference to FIG. 6, where all elements similar to those of FIG. 5 have similar reference characters, an example of a retro-reflective vertical light diffusion display system in accord with the present invention may use two projectors 17 and 19 to project a respective left-eye image and a right-eye image onto retro-reflective vertical light diffusion screen 23. Due to the retro-reflective properties of screen 23, the left-eye image produced by projector 17 is reflected back towards projector 17 and creates a first viewing window 27. Similarly, the right-eye image produced by projector 19 is reflected back towards projector 19 and creates a second viewing window 29.

It is to be understood that each of viewing windows 27 and 29 produces a respective monoscopic image spanning the entirety of screen 23, but when viewed together, as is explained below, a stereoscopic image spanning the entirety of screen 23 may be produced. On the other hand, if only one projector were used, or if all projectors projected the same image, then a single monoscopic image would be produced since each viewing window would have the same monoscopic image.

As is explained above, the spacing between the eyes of a viewer, i.e. an observer, typically ranges from 52 mm to 78 mm. If it is desired to create a stereoscopic effect, it is further preferred that the projection lenses of projectors 17 and 19 be placed less than 52 mm apart (or alternatively be placed within the range of 52 mm to 78 mm). By spacing projectors 17 and 19 less than 52 mm apart, it becomes very likely that if an observer's left eye is within first viewing window 27 and thus viewing the left-eye image created by projector 17, then the observer's right eye will likely be within second viewing window 29 and thus viewing the right-eye image created by projector 19. In this manner, a stereoscopic viewing window 31 is created by combining two monoscopic viewing windows 27/29 from two adjacent projectors 17/19.

Figure 7:
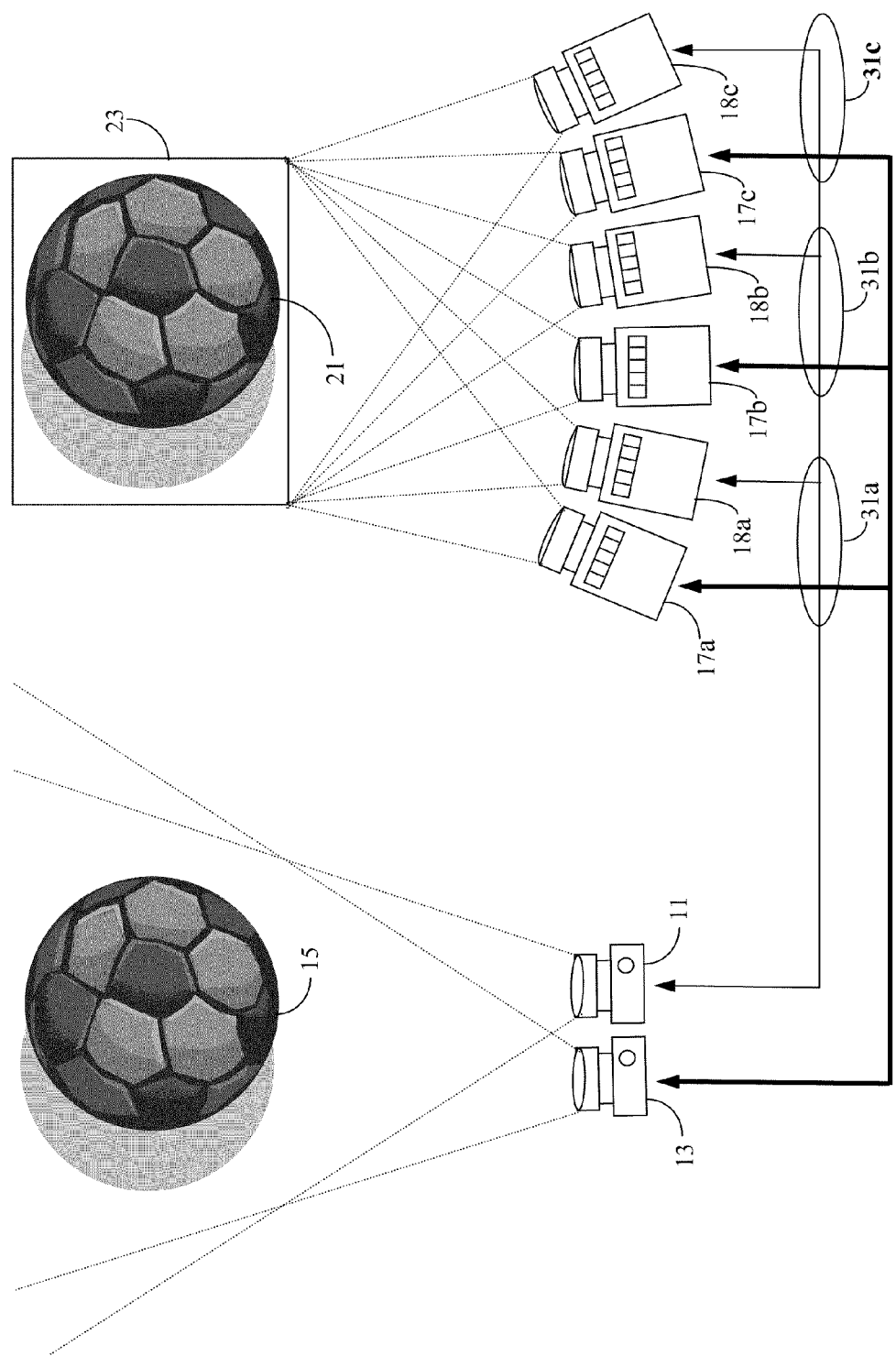
FIG. 7 shows multiple stereoscopic viewing windows created by combining multiple pairs of projectors projecting left-eye images and right-eye images from a corresponding left-eye camera and a right-eye camera.

With reference to FIG. 7 where elements similar to those of FIGS. 5 and 6 have similar reference characters and are described above, multiple stereoscopic viewing windows 31a to 31c are created by combining multiple pairs of projectors 17a/19a to 17c/19c projecting left-eye images and right-eye images from corresponding left-eye camera 13 and right-eye camera 11. In the present example, three pairs of projectors are used to create three adjacent stereoscopic viewing windows 31a-31c, and thereby create a stereoscopic viewing region spanning the three stereoscopic viewing windows. However, more projectors may be used to create an even greater number of stereoscopic viewing windows, and if this greater number of stereoscopic viewing windows are created adjacent each other, then an even larger stereoscopic viewing region may be created.

It is also to be understood that if one of cameras 13 or 11 is removed, and the same image from the sole remaining camera is fed to all six projectors 17a-17c and 19a-19c, then six individual, adjacent monoscopic viewing windows would be created. This would result in a large monoscopic viewing area spanning all six projectors.

Figure 8:
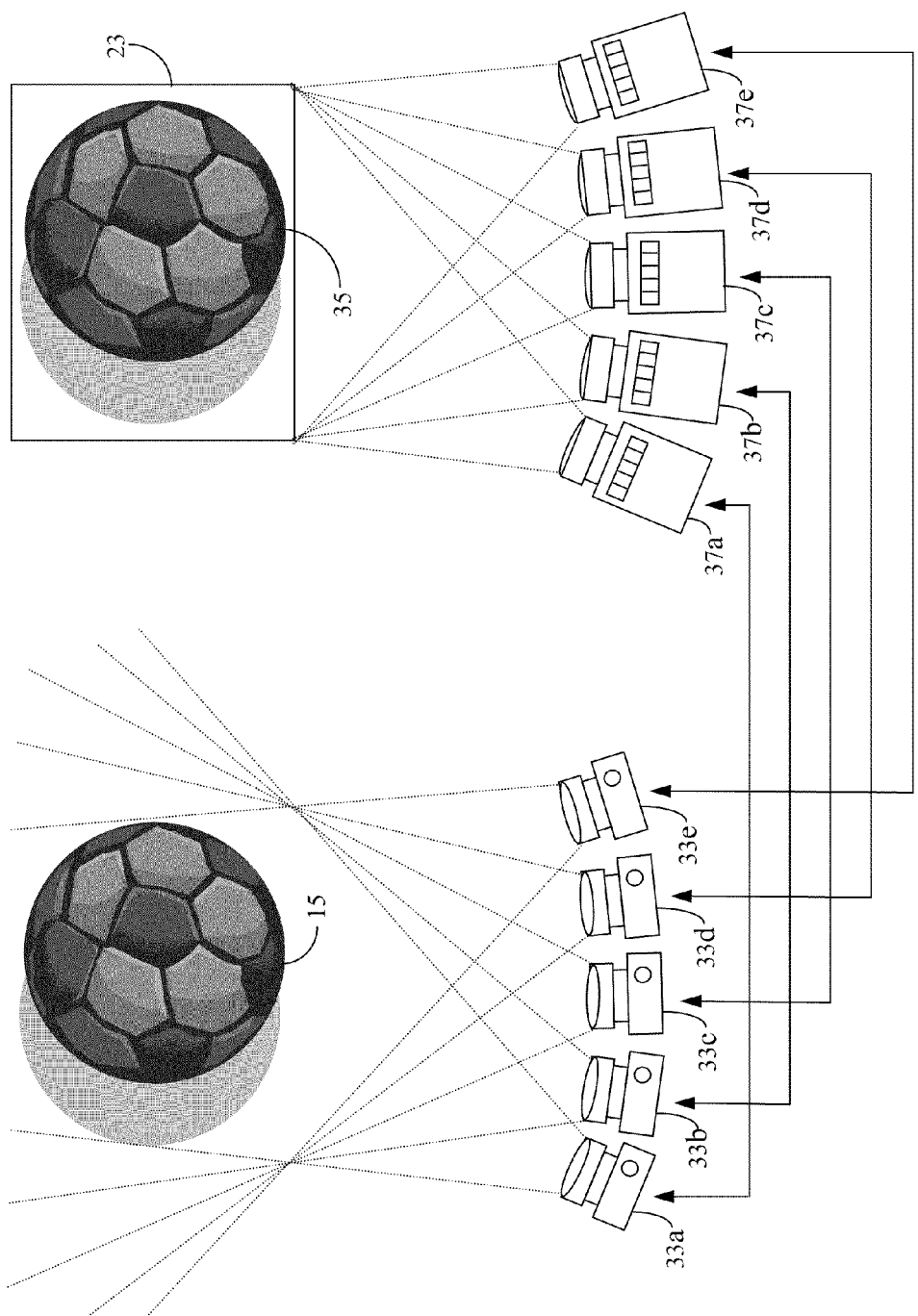
FIG. 8 illustrates an alternate embodiment of the present invention suitable for creating a multiscopic viewing area.

FIG. 8 illustrates an alternate embodiment of the present invention suitable for creating a multiscopic viewing area. In the present case, multiple cameras 33a-33e are used to create five viewing windows, each with distinct images from five distinct viewing angles. Although the present example uses only five cameras to span the width of videoed (or photographed) subject 15, it is to be understood that a greater number of cameras may be used to span even wider subjects or to create finer view-angle images (i.e. narrower viewing windows) of the same subject. A multiscopic image 35 is then created by projecting the image from each of cameras 33a-33e by a corresponding projector 37a-37e having a similar placement arrangement as cameras 33a-33e. This creates five monoscopic viewing windows with five distinct viewing angles, and if an observer were to walk the span from projector 37a to projector 37e, the observer would see multiscopic image 35 from each of the five distinct viewing angles and appear to be walking by subject 15.

If desired, it may be preferred to increase the width of adjacent viewing windows (such as by increasing the spacing between the lenses of adjacent projectors) to be greater than the spacing between the observer's eyes so that the observer sees the same viewing window with both eyes. In this manner, the observer would perceive multiple monoscopic images of subject 15 from different view angles. Alternatively, the widths of adjacent viewing windows may be made smaller than the spacing between the observer's eyes so that the observer would perceive stereoscopic vision as the observer traversed the span of all adjacent viewing windows.

Figure 9:
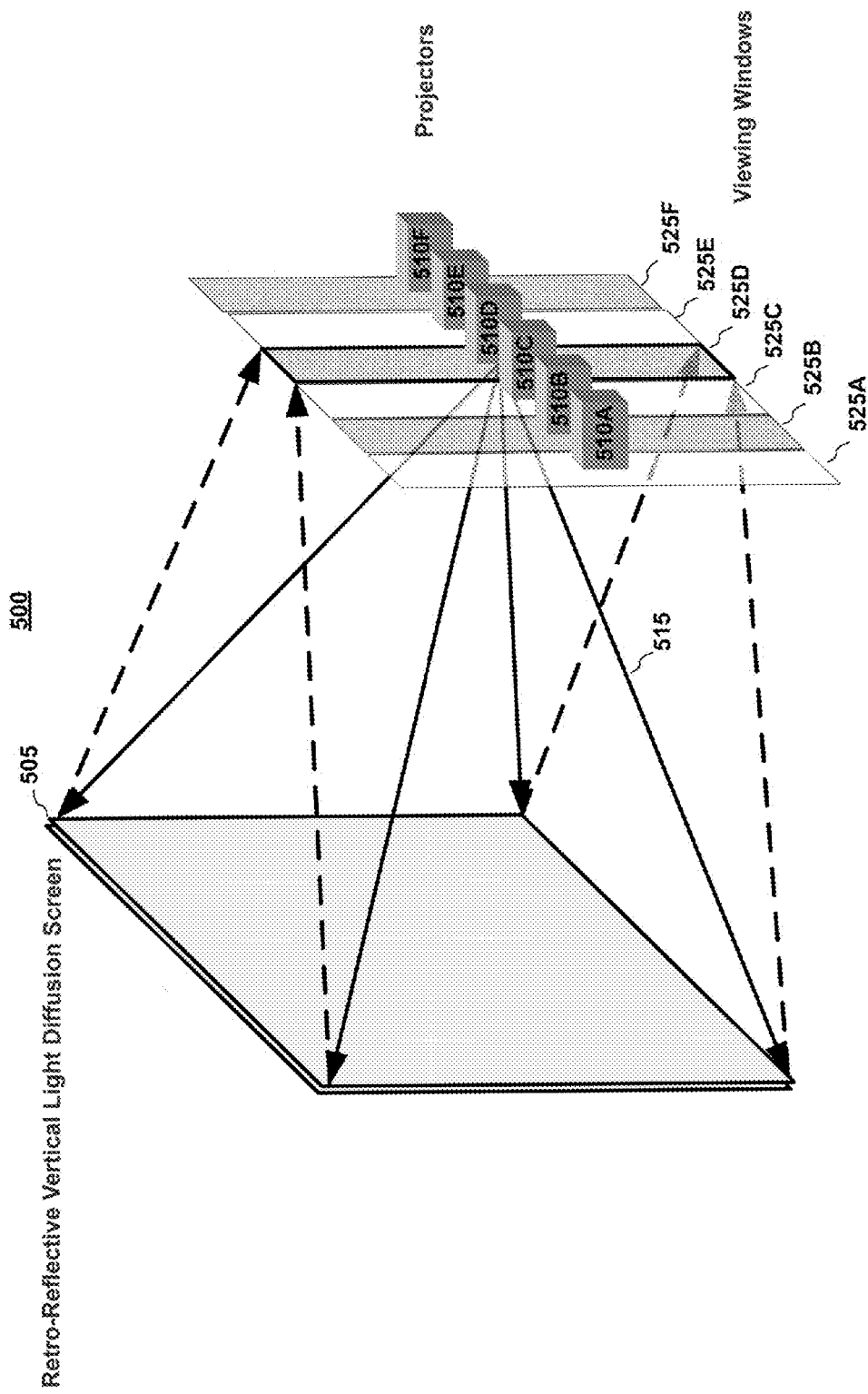
FIG. 9 shows that a multiscopic, stereoscopic, and/or monoscopic system in accord with the present invention may include a retro-reflective vertical light diffusion screen and a set of projectors.

With reference to FIG. 9, a multiscopic, stereoscopic, and/or monoscopic system 500 in accord with the present invention may include a retro-reflective vertical light diffusion screen 505 and a set of projectors 510A-F. It should be noted that although FIG. 9 depicts six projectors, additional or fewer projectors could be used. The retro-reflective vertical light diffusion screen 505 is used as the display screen in a similar manner as described with reference to FIG. 4. Namely, the light rays 515 emitted from any of projectors 510A-F are reflected back to the same projector from which the light rays originated and create a viewing window that overlaps with the same projector. For example, the light from projector 510A is reflected and diffused by the screen 505 to form viewing window 525A. This result is the same for each projector in the display system 500, wherein each projector 510A-F generates a corresponding viewing window 525A-F, respectively. Thus, by adding more projectors, more such viewing windows are created.

The display system depicted in FIG. 9 generated six distinct viewing windows. Each viewing window displays an image from a corresponding projector. By displaying a set of images captured from multiple perspectives on the screen through the projectors, a user can see 3D through these viewing windows, or view slits. For example, if a user views one image in one viewing window with one eye and views another perspective image in another viewing window with user's other eye, then the user will perceive a 3D image. In some embodiments, the width of viewing window can be sufficiently small that a user does not perceive a monoscopic (i.e. monocular) image because both eyes cannot view the same viewing window at the same time.

One skilled in the art would recognize that there are several advantages to a display system of the kind depicted in FIG. 9. First, the images are bright. Due to the one-dimensional light diffusion, a user will see an image that is much brighter than the image on a regular diffusion screen.

Second, the display screen can be configured into different shapes. Due to the retro-reflective property of the material, the screen shape could take arbitrary forms, such as regular planar, cylindrical shape, spherical shape, or almost any irregular shape. These shape variations do not affect the refocusing property of the retro-reflective screen.

Third, the display system is easily scalable. For example, more viewing windows can be generated by simply adding more projectors.

Fourth, the display system does not have the resolution limitations of prior solutions. Even though all the images are projected on the same screen, each image is only seen in the designated viewing window; therefore, the resolution can be as high as the resolution of the projector.

Fifth, the display system does not suffer from a picket fence effect, i.e. darkened vertical lines between adjacent viewing windows. Because the user perceives one full resolution image from a single projector at each viewing window, there is no picket fence effect in the image.

Sixth, if the multiscopic system of FIG. 8 is implemented with one distinct viewing angle per projector, the display system does not suffer from an image flipping effect. In an alternate system, the flipping effect occurs when a user moves his head across the viewing zones and perceives a right-eye image in his left eye and a left-eye image in his right eye. The system of FIG. 8 does not have repeated viewing zones with specific stereo pair images and therefore does not have image flipping problems. Rather, each viewing window displays a perspective view image and any pair of images forms a 3D view. For example, the viewing windows may have a progression of perspective view images, wherein any two images form a 3D view. Using this approach, the viewing windows may be made arbitrarily small since the observer does not need to peer through adjacent view windows. Since the collection of adjacent view windows creates one continuous panorama of views, any two view windows will create the correct view angle combinations to create a proper stereoscopic view.

Finally, the display system can potentially have an infinite number of viewing windows. Although theoretically the display system can generate an infinity number of viewing windows, the number of viewing windows that can be generated depends upon the horizontal diffusion angle of the diffusion material, the distance from the projector to the screen and the size of the projector.

As is explained above, the presently preferred embodiment is a retro-reflective display system that contains a projection module and a special screen, as shown in FIG. 4. Preferably, the projection module contains two projectors (as shown in FIGS. 5 and 6) or multiple projectors (as shown in FIGS. 7-9) and projects stereo 3D content (i.e. stereoscopic) or multiview 3D contents (i.e. multiscopic) on a special screen. The special screen, called a retro-reflective vertical light diffusion screen (RVLDS), has the special properties of light focus and directional light diffusion. Due to the focus property, the screen is able to form a viewpoint (i.e. viewing window) at the location of the projector if only one projector is used and multiple viewpoints (i.e. viewing windows) if multiple projectors are used. Due to the directional light diffusion property, the light is diffused with a large diffusion angle in the vertical direction and a small diffusion angle in the horizontal direction. As a result of this directional light diffusion, the viewpoints formed by the screen are extended in both vertical and horizontal direction to a vertical rectangular viewing window centered with the aperture of the projection lens. The width of the viewing window is a function of the horizontal diffusion angle of the screen, the distance from the projector to the screen, and the aperture size of the projection lens The following discussion is an analysis based on a presently preferred 3D display system. However, these results are also applicable to the other viewing window based systems discussed above, including the other viewing window 3D display systems. Specifically, the present analysis addresses ways to reduce crosstalk between adjacent viewing windows.

Figure 10:
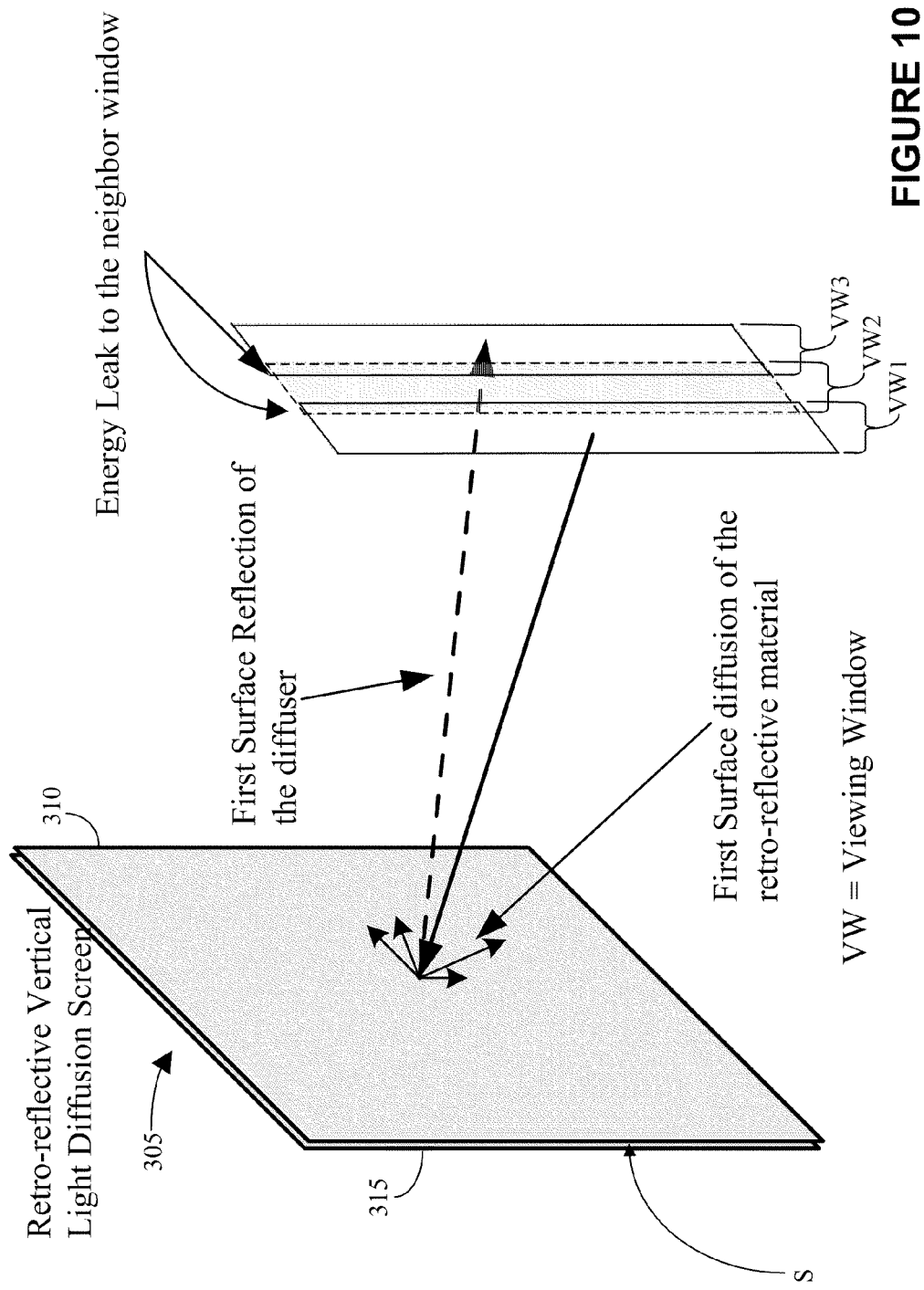
FIG. 10 shows three major sources of the crosstalk between viewing windows.

Crosstalk among viewing windows can plays a major role in degrading image quality and affecting 3D perception. From experimentation, Applicants have identified three major sources of the crosstalk, as shown in FIG. 10, and identified as:

(a) Energy leakage between neighboring viewing windows due to Gaussian diffusion.

(b) Front surface reflection of the diffuser and the retroreflective material.

(c) Front surface diffusion of the retro-reflective material.

As is explained above, the retro-reflective vertical light diffusion screen 305 includes a layer of a one-dimensional light diffusion material 310 and a layer of a retro-reflective material 315. In the present example, three viewing windows VW1, VW2, and VW3 are shown experiencing crosstalk, as is indicated by an overlap between viewing windows VW1 and VW2 and between viewing windows VW2 and VW3. In the following discussion, the above three listed sources of crosstalk will be identified as type (a), type (b), and type (c).

In the past, one solution proposed for the type (a) crosstalk is using a triple layer screen and one solution proposed for type (c) crosstalk is keeping an air space between the diffusion layer and the retro-reflective layer. In the following sections, another solution for type (a) crosstalk and one solution for type (b) crosstalk is discussed.

Figure 11:
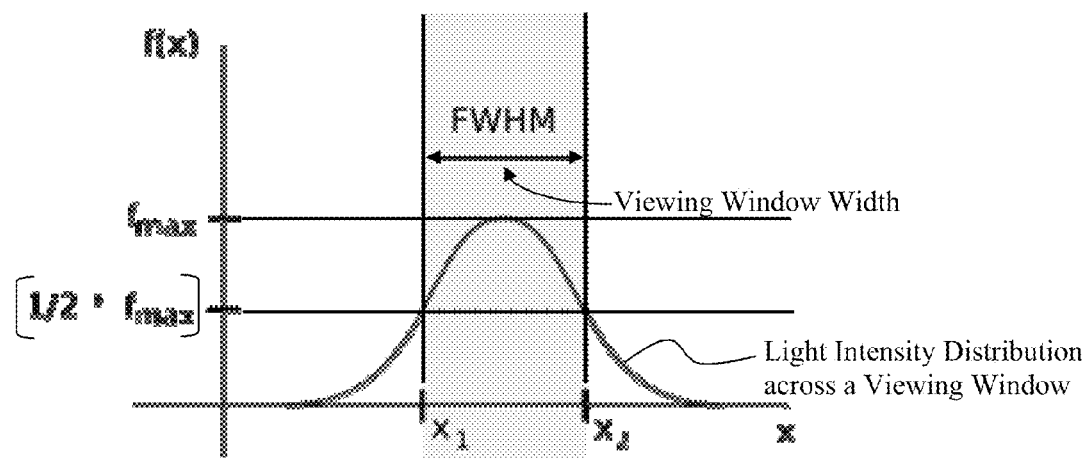
FIG. 11 demonstrates the full width at half maximum (FWHM) region of a plot.

Type (a) crosstalk is caused by Gaussian diffusion between adjacent viewing windows. It has been previously demonstrated that light is distributed in a viewing window following a Gaussian distribution. That is, the width of a viewing window may be defined by the full width at half maximum (FWHM), as shown in FIG. 11. $F_{max}$ identifies the maximum light intensity, and points $x_1$ and $x_2$ indicate where the light intensity is half its maximum. Points $x_1$ and $x_2$ also indicate the side-edges of a viewing window.

Figure 12:
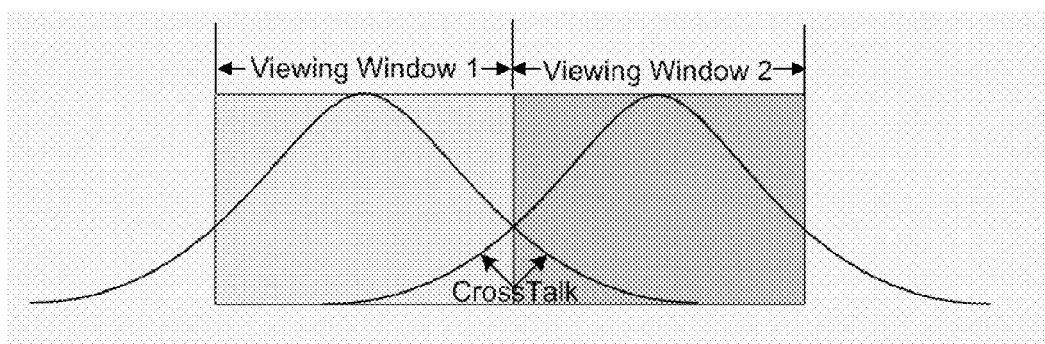
FIG. 12 illustrates that the light diffusion angle is defined at the FWHM position, and Gaussian energy leakage between neighboring viewing windows.

Since the light diffusion angle is defined at the FWHM position, there is a certain amount of energy leakage to neighboring viewing windows, as shown in FIG. 12. As a result, inside each viewing window (for example inside Viewing Window 1) an observer will see the image of the projector that created the current viewing window (i.e. Viewing Window 1) and also see ghost images from neighboring projectors (i.e. from a neighboring viewing window, such as Viewing Window 2). The ghost images may significantly reduce the image contrast and affect the observer's 3D perception.

One straight-forward way of reducing ghost image is to increase the space between two neighboring viewing windows and reduce the amount of leaked energy. However, this method will introduce dark strips, or lines, between adjacent viewing windows and adversely affect a mosaiced image constructed when an observer stands behind or in front of the screens so as to peer through multiple viewing windows at the same time. Therefore, this approach is not an optimal solution for a system that seeks to form continuous viewing windows.

Previously a method for reducing type (a) crosstalk by refocusing diffused beam using lenses has been disclosed, but in this method the lens are placed in front of the diffusion material, which may introduce additional crosstalk to a viewing window. Therefore, this method requires high optical quality and expensive lenses, which dramatically increase the screen cost.

An alternative solution to this problem is to use screen material with a small diffusion angle. As the diffusion angle gets smaller, the Gaussian profile becomes sharper and less energy leaks to a neighboring viewing window. Ideally, a zero horizontal diffusion angle is desired. With current state-of-the-art technology, the diffusion angle can be as small as 0.2 degree, which can reduce the crosstalk significantly if the projectors are not far away from the screen. One side effect of reducing the diffusion angle, however, is that the width of a viewing window becomes narrower, which creates a need for additional projectors to maintain a current field of vision for an observer. For example, if the diffusion angle is about 0.2 degrees, the viewing window width could be very narrow and require 3-6 times more projectors to achieve a similar projection baseline as using a large diffusion angle screen. This is because the width of a viewing window is determined mainly by the size of the lens aperture, which could be only a few millimeters for a portable projector or 10 to 20 mm for a large office projector. Furthermore, projectors must have a small form factor in order to be packed closely for achieving continuous viewing windows when the viewing windows are very narrow.

Figure 13:
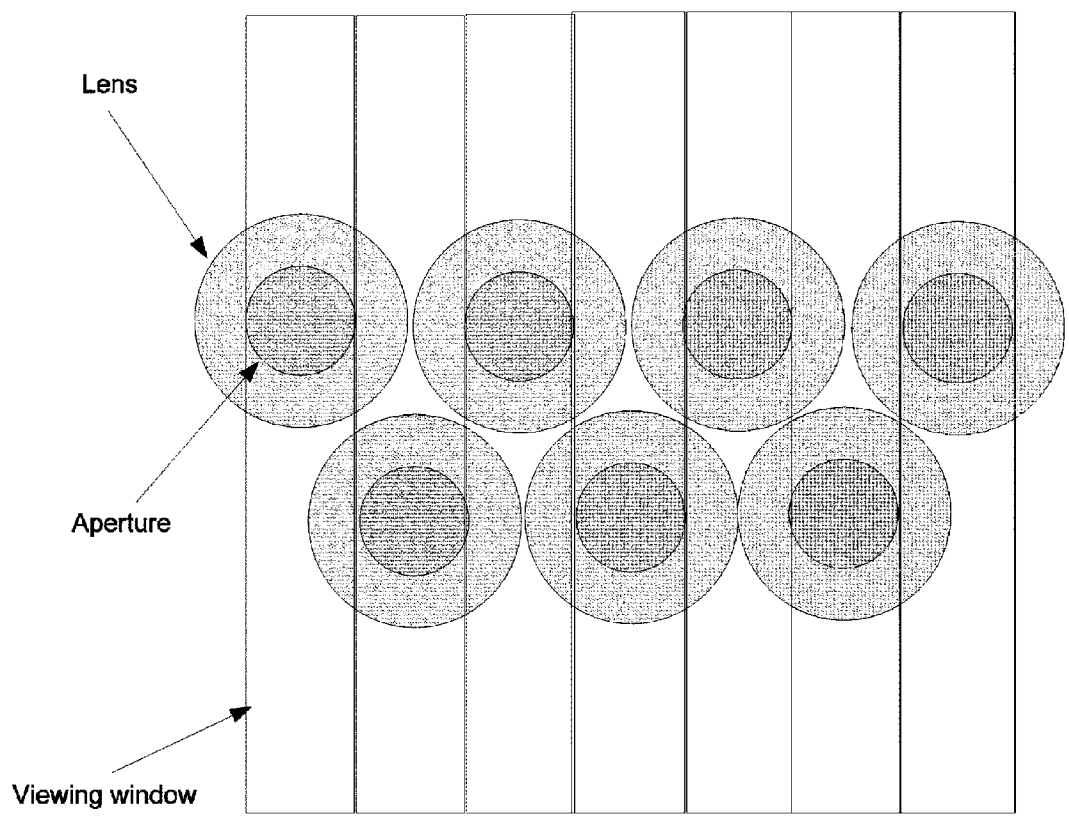
FIG. 13 illustrates one example of an arrangement of projectors that are packed closed by being arranged into two layers, or rows, in a zig-zag formation.

FIG. 13 illustrates one example of an arrangement of projectors that are packed close by being arranged on multiple tiers, or rows. The width of the lens aperture of each projector defines a viewing window. The projectors are arranged on the multiple tiers such that the lens aperture of adjacent projectors on neighboring tiers are offset so that a first edge of the aperture of each projector aligns with the corresponding opposite edge of the aperture of its adjacent projector. Although three or more tiers may be used, in the present example, the projectors are arranged in two tiers, or rows, in a zig-zag formation. Large apertures are preferred because fewer projectors are needed to form a wider projection baseline, and fewer projectors are needed per tier so that the projectors can be bigger.

FIG. 13 shows the viewing windows created through large aperture lenses with a triple layer screen or through a diffusion screen with a small diffusion angle (i.e. a diffusion angle in which the horizontal diffusion is negligible). Obviously, a projector with large aperture is desired when the diffusion angle is small. A large aperture means a reduced number of projectors are needed for maintaining a large projection baseline.

Next is presented a preferred approach for addressing type (b) crosstalk due to front surface reflection of the diffuser and the retroreflective material.

As is shown in FIG. 10, a retro-reflective vertical light diffusion screen 305 includes a diffuser (comprised of a plastic substrate S with a coating of a one-dimensional light diffusion material 310 on one surface) and a retroreflective material 315 on the opposite side of the diffuser. On the surfaces of the one-dimensional light diffusion material 310 and the retroreflective material 315, incident light from a projector is partially mirror reflected. This mirror reflection is the cause of the type (b) cross talk, i.e. surface reflection crosstalk, which manifests itself as a white vertical line of a screen. Applicants have found that if there is only a small amount of light that is surface reflected, an observer may still see a strong white vertical line on the screen.

It might seem reasonable that a straight forward solution for this surface reflection crosstalk problem is to add an anti-reflection coating on both surfaces of the diffuser and the retroreflective material. However, current state-of-the-art anti-reflection coating technology can only reduce surface reflection and cannot eliminate it, and is thus unable to eliminate this type crosstalk.

Indeed, Applicants have found that the one-dimensional light diffusion material 310 coating on the plastic substrate of the diffuser already already has antireflective properties. If this coating side is made to face the projector, with no additional antiflection coating added, only 8% of light is reflected. If an antireflecting coating is then added, the reflected light is reduced to 5% or 3%, which is only a slight improvement, and the surface reflection problem is still perceivable by an observer.

Figure 14:
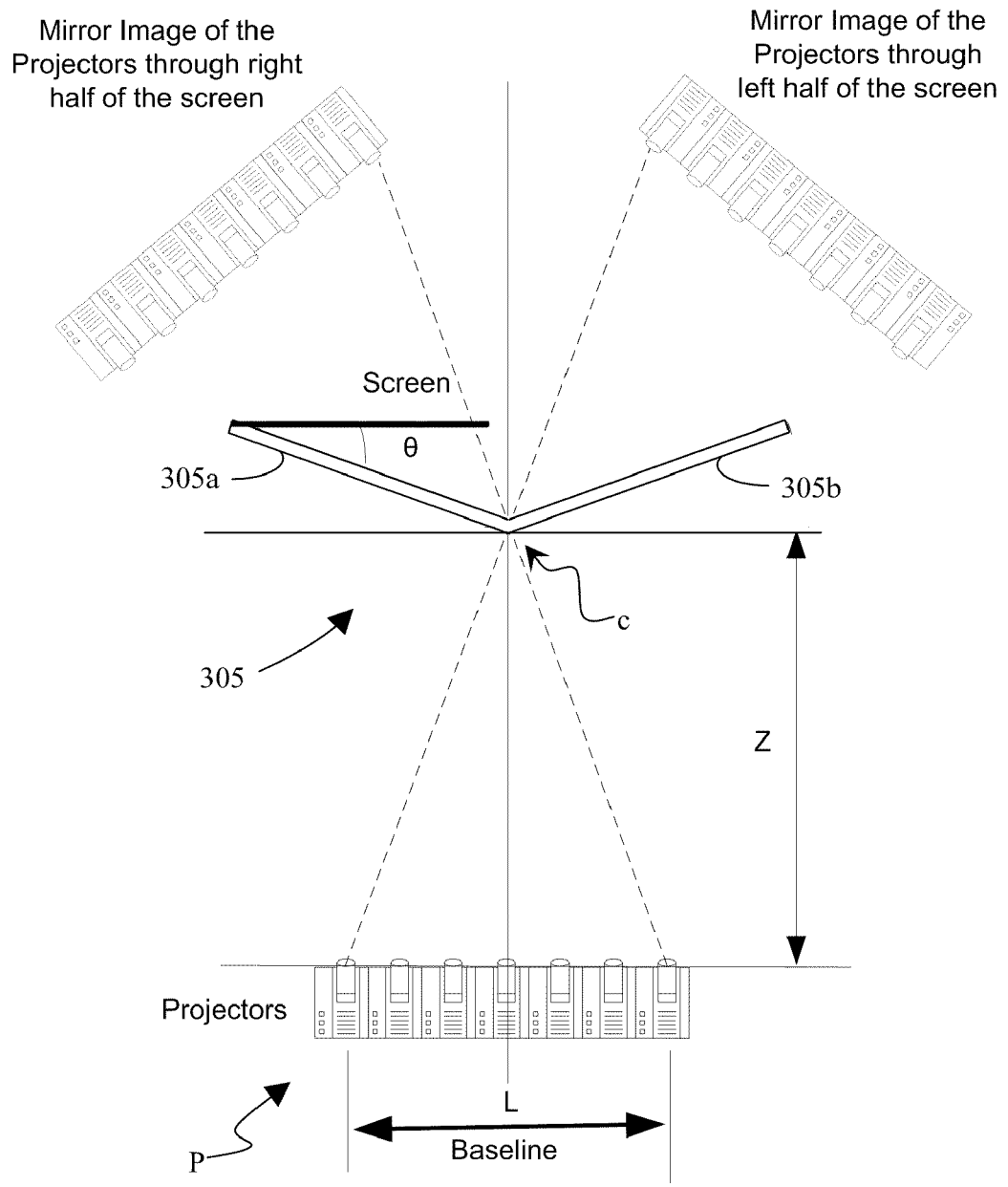
FIG. 14 shows a first example of a tilted screen along a left-side and a right-side to counter surface reflection crosstalk effects.

To further reduce, or eliminate, type (b) surface reflection crosstalk, a screen may be folded, as illustrated in FIG. 14. For this method, the left-half side 305a and the right-half side 305b of screen 305 is tilted to form a V-shape screen, tilted away from the projector baseline. The tilted screen reflects the light away from the row of projectors P, which is not perceivable from the projection baseline. By tilting the screen, the surface reflection is moved away from an observer peering through a viewing window. In the present case, the mirror image of projectors P due to the screen's left-half side 305a is shown off to a side and no longer inside the projector's left-half field of vision (FOV). Similarly, the mirror image of projectors P due to the screen's right-half side 305b is shown off to another side and also no longer inside the projector's right-half FOV.

The tilting angle θ of the screen depends on the width L of the projection baseline (i.e. the span of adjacent projectors P) and the perpendicular distance Z from the projection baseline to the horizontal pivot point c of the screen 305. Tilting angle θ is given by:

$$\theta = \tan\left(\frac{L}{2Z}\right) \quad (1)$$

Figure 15:
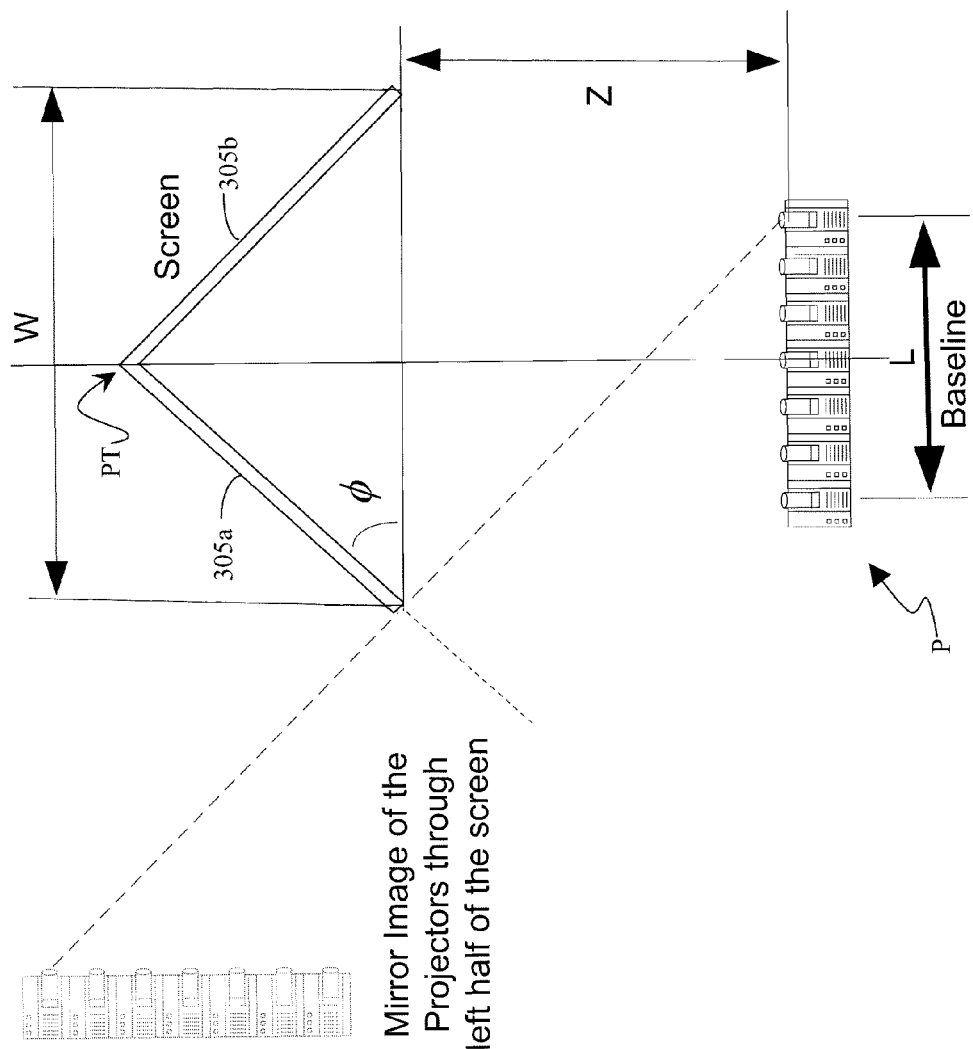
FIG. 15 shows a second example of a tilted screen along a left-side and a right-side to counter surface reflection crosstalk effects.

The screen can also be tilted in the opposite direction, towared projectors P, as shown in FIG. 15 (where all elements similar to those of FIG. 14 have similar reference characters and are described above). In this case, the tilting angle θ is further related to the span W from the tip of the left-half side 350a to the tip of the right-side half 305b. The tilting angle φ for this case is given by:

$$\phi = \tan\left(\frac{L+W}{2Z}\right) \quad (2)$$

Obviously, the second case requires a larger tilt angle, therefore, the first case may be preferred for our display setup.

As indicated by equations 1 and 2, the tilt angles θ and φ of the screen increase as the length L of the projection baseline increases since the surface reflections should be kept out of the perpendicular view of the projection baseline. In many applications, however, a thin (i.e. small depth) and flat screen is preferred, rather than one tilted toward or away from the projection baseline at a pivot point PT.

Figure 16:
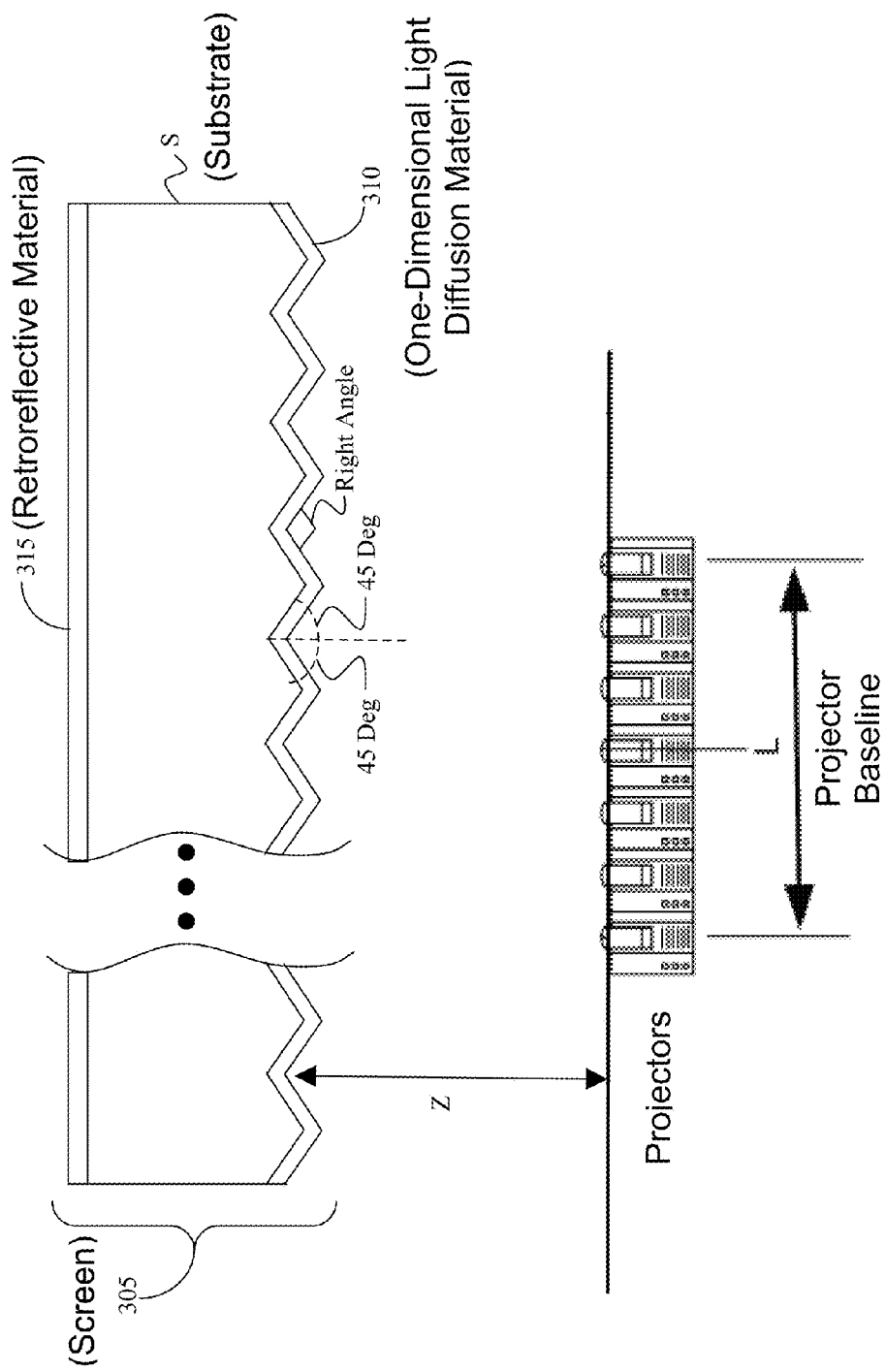
FIG. 16 shows an embodiment for countering surface reflection crosstalk effect wherein the front surface of the screen is cut with vertical V-shaped grooves to reflect mirror reflections away from a projection baseline.

A preferred embodiment is shown in FIG. 16, where all elements similar to those of FIGS. 10, 14 and 15 have similar reference characters and are described above. In this approach, the screen 305 again starts with a substrate S. The back surface of the material substrate S has a layer of a retro-reflective material 315, and the front surface of the material substrate S is cut with many V-shaped, vertical grooves, which form miniature structures with small tilted planes. Preferably, the V-shaped vertical grooves form tilt angles β defined as 45 degrees with respect to a direction normal to the projection base line. That is, the two facing panels of each v-shaped groove form 90 degree angle between them, i.e. they form a right angle at their junction.

As is explained above, the horizontal diffusion is preferably as small as practical. In this case, the surface reflection of each projector may be reflected back to the same projector from which the light originated, so that crosstalk between adjacent projectors is eliminated.

The surfaces of these small tilted planes are coated with the one-dimenational (preferably vertical) light diffusion material 310. The miniature structure is made with facing panels as small as practical so that screen 305 appears flat to an observer.

Figure 17:
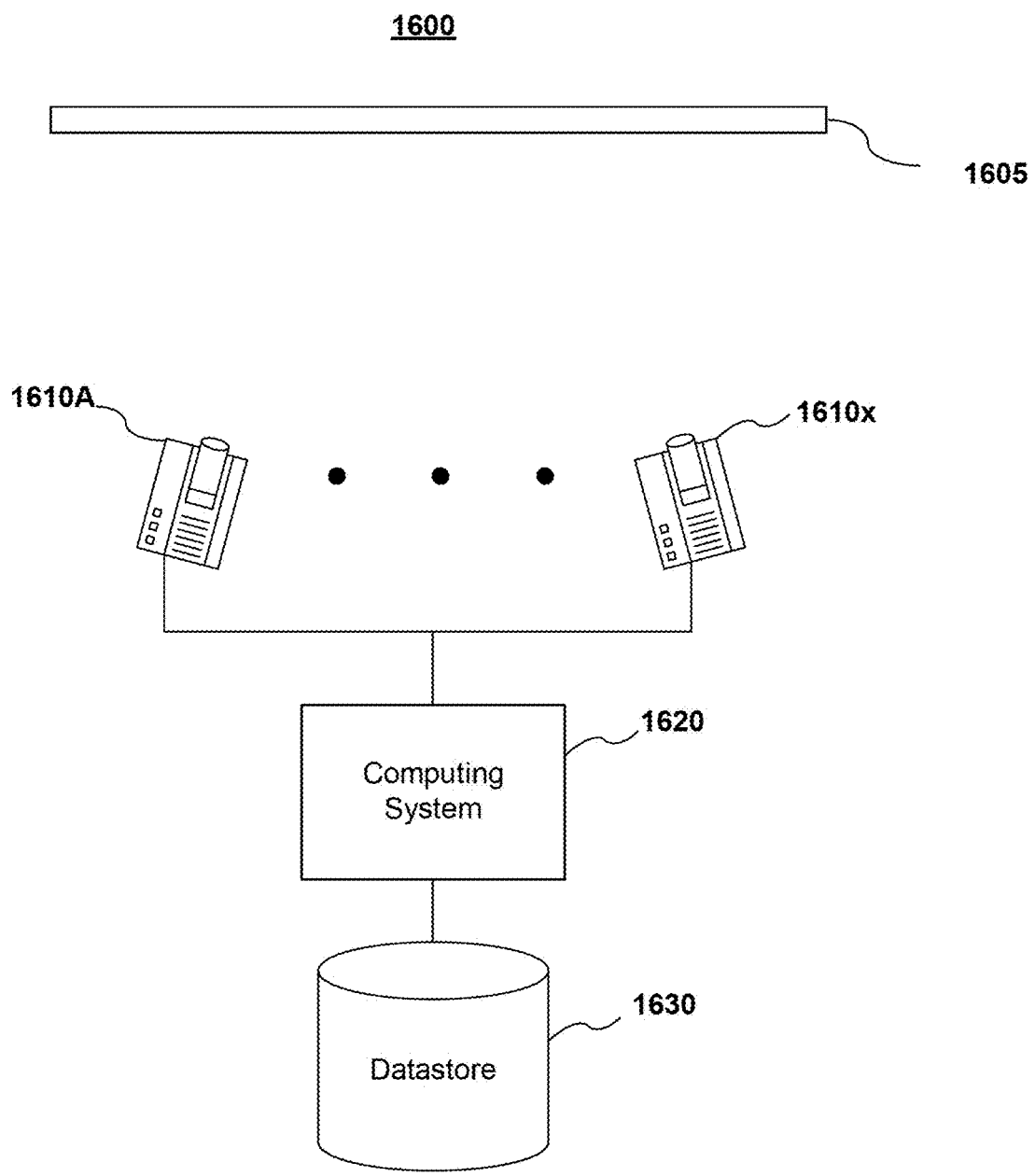
FIG. 17 illustrates a multi-projector display system.

FIG. 17 illustrates a multi-projector display system 1600 with at least one retro-reflective vertical light diffusion screen 1605 according to the present invention. The system comprises a retro-reflective vertical light diffusion screen 1605 and a plurality of projectors 1610A to 1610x. In the depicted system 1600, the projectors 1610A-1610x may be under the control of a computing system 1620. The computing system may contain, or alternatively may be communicatively connected to, a datastore 1630 that stores a set of perspective images. The computing system 1620 coordinates the displaying of perspective views on the screen 1605 via the projectors 1610A-1610x to generate a multiscopic display.

It shall be noted that the present invention may be implemented using an instruction-execution/computing device or system capable of processing data, including without limitation, a general-purpose computer and a specific computer, such as one intended for data or image processing. The present invention may also be implemented with other computing devices and systems. Furthermore, aspects of the present invention may be implemented in a wide variety of ways including software, hardware, firmware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Figure 18:
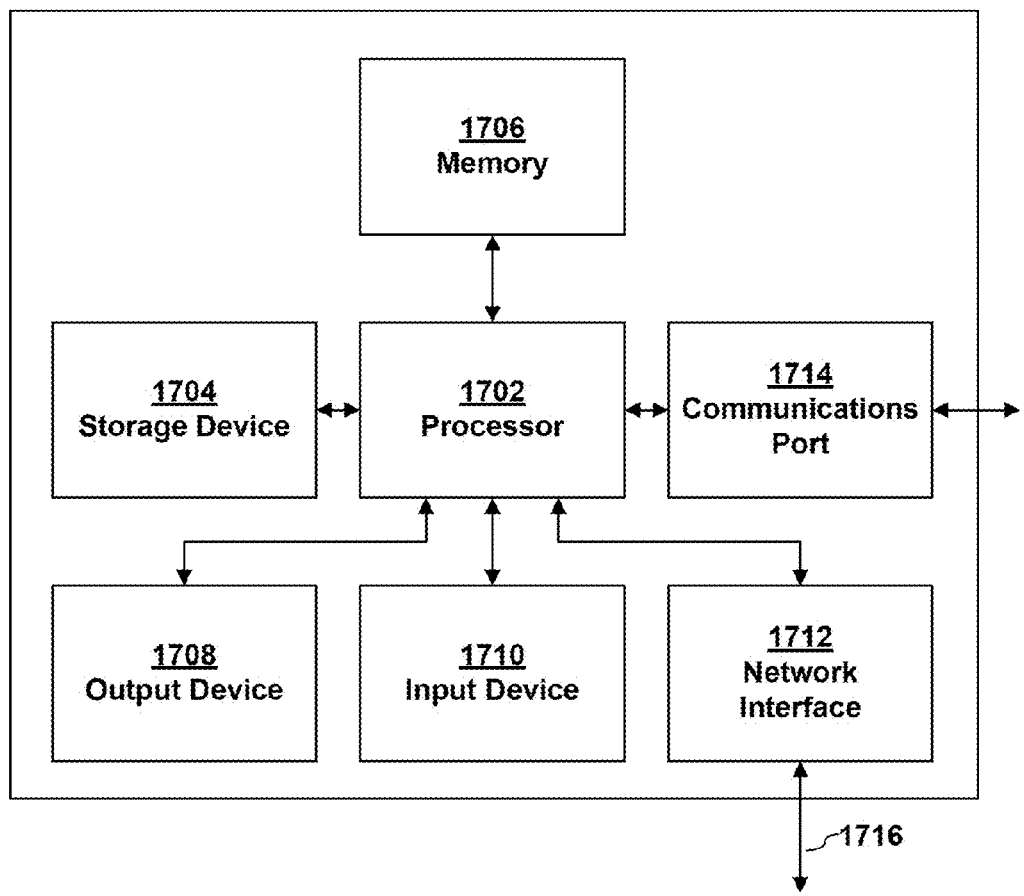
FIG. 18 depicts a block diagram of an example of a computing system.

FIG. 18 depicts a functional block diagram of an embodiment of an instruction-execution/computing device 1700 that may be implemented with embodiments of the present invention. As illustrated in FIG. 18, a processor 1702 executes software instructions and interacts with other system components. In an embodiment, processor 1702 may be a general purpose processor such as (by way of example and not limitation) an AMD processor, an INTEL processor, a SUN MICROSYSTEMS processor, or a POWERPC compatible-CPU, or the processor may be an application specific processor or processors. A storage device 1704, coupled to processor 1702, provides long-term storage of data and software programs. Storage device 1704 may be a hard disk drive and/or another device capable of storing data, such as a magnetic or optical media (e.g., diskettes, tapes, compact disk, DVD, and the like) drive or a solid-state memory device. Storage device 1704 may hold programs, instructions, and/or data for use with processor 1702. In an embodiment, programs or instructions stored on or loaded from storage device 1704 may be loaded into memory 1706 and executed by processor 1702. In an embodiment, storage device 1704 holds programs or instructions for implementing an operating system on processor 1702. In embodiments, possible operating systems include, but are not limited to, UNIX, AIX, LINUX, Microsoft Windows, and the Apple MAC OS. In embodiments, the operating system executes on, and controls the operation of, the computing system 1700. If desired, storage 1704 may be implemented as Datastore 1630 of FIG. 17.

An addressable memory 1706, coupled to processor 1702, may be used to store data and software instructions to be executed by processor 1702. Memory 1706 may be, for example, firmware, read only memory (ROM), flash memory, non-volatile random access memory (NVRAM), random access memory (RAM), or any combination thereof. In one embodiment, memory 1706 stores a number of software objects, otherwise known as services, utilities, components, or modules. One skilled in the art will also recognize that storage 1704 and memory 1706 may be the same items and function in both capacities. In an embodiment, one or more of the software components or modules may be stored in memory 1704, 1706 and executed by processor 1702.

In an embodiment, computing system 1700 provides the ability to communicate with other devices, other networks, or both. Computing system 1700 may include one or more network interfaces or adapters 1712, 1714 to communicatively couple computing system 1700 to other networks and devices. For example, computing system 1700 may include a network interface 1712, a communications port 1714, or both, each of which are communicatively coupled to processor 1702, and which may be used to couple computing system 1700 to other computer systems, networks, and devices.

In an embodiment, computing system 1700 may include one or more output devices 1708, coupled to processor 1702, to facilitate displaying graphics and text. Output devices 1708 may include, but are not limited to, a projector, a display, LCD screen, CRT monitor, printer, touch screen, or other device for displaying information. Computing system 1700 may also include a graphics adapter (not shown) to assist in displaying information or images on output device 1708.

One or more input devices 1710, coupled to processor 1702, may be used to facilitate user input. Input device 1710 may include, but are not limited to, a pointing device, such as a mouse, trackball, or touchpad, and may also include a keyboard or keypad to input data or instructions into computing system 1700.

In an embodiment, computing system 1700 may receive input, whether through communications port 1714, network interface 1712, stored data in memory 1704/1706, or through an input device 1710, from a scanner, copier, facsimile machine, or other computing device.

One skilled in the art will recognize no computing system is critical to the practice of the present invention. One skilled in the art will also recognize that a number of the elements described above may be physically and/or functionally separated into sub-modules or combined together.

It shall be noted that embodiments of the present invention may further relate to computer products with a computer-readable medium that have computer code thereon for performing various computer-implemented operations. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a computer. Examples of program modules include libraries, programs, routines, objects, components, and data structures. In distributed computing environments, program modules may be physically located in settings that are local, remote, or both.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A screen system, comprising: a plurality of projectors, each configured to project a unique image; a screen having a front surface and a back surface, with the front surface facing said plurality of projectors; a viewing region defined in an area substantially along a line normal from said projectors to said screen; wherein said screen is divided into a left plane and a right plane, said left and right planes being angled at a junction joining said left plane to said right plane, said angle being sufficient for directing a mirror reflection on said left and right planes, of the unique images from said projectors, away from said viewing region; and wherein said left and right planes are angled away from said projectors so that said junction is the part of the screen closest to the projectors, the left and right planes forming a first target angle, θ, with reference to a first reference line perpendicular to a second reference line normal to said projectors traversing said junction, said first target angle being not less than $$\theta = \tan\left(\frac{L}{2Z}\right)$$

wherein said plurality of projectors are arranged in a series of adjacent projectors, L is the length of a projection baseline defined by the physical length from the first lens of the first projector within said series of adjacent projectors to the last lens of the last projector within said series of adjacent projectors, and Z is the normal distance from said junction to said series of adjacent projectors.

2. The screen system of claim 1, wherein said screen is a retro-reflective vertical light diffusion screen.

3. The screen system of claim 1, wherein said screen includes a substrate with a retro-reflective material layer on one surface and a one-dimensional light diffusion material layer on its opposite surface, the surface having the one-dimensional light diffusion material layer being said front surface of the screen.

4. The screen system of claim 1, wherein said first target angle θ is $$\theta = \tan\left(\frac{L}{2Z}\right).$$

5. A screen system, comprising:
a plurality of projectors, each configured to project a unique image;
a screen having a front surface and a back surface, with the front surface facing said plurality of projectors;
a viewing region defined in an area substantially along, a line normal from said projectors to said screen;
wherein said screen is divided into a left plane and a right plane, said left and right planes being angled at a junction joining said left plane to said right plane, said angle being sufficient for directing a mirror reflection on said left and right planes, of the unique images from said projectors, away from said viewing region;
wherein said left and right planes are angled toward said projectors so that said junction is the part of the screen farthest from the projectors, the left and right planes forming a second target angle, φ, with reference to a first reference line perpendicular to a second reference line normal to said projectors traversing said junction, said second target angle being not less than $$\phi = \tan\left(\frac{L+W}{2Z}\right)$$

wherein said plurality of projectors are arranged in a series of adjacent projectors, L is the length of a projection baseline defined by the physical length from the first lens of the first projector within said series of adjacent projectors to the last lens of the last projector within said series of adjacent projectors, Z is the normal distance from said junction to said series of adjacent projectors, and W is the span from the far-end of the left plane with reference to said junction to the far-end of the right plane with reference to said junction.

6. The screen system of claim 5, wherein said second target angle θ is $$\phi = \tan\left(\frac{L+W}{2Z}\right).$$

7. The screen system of claim 5, wherein the left and right planes are of equal width.

8. The screen system of claim 7, wherein said screen is divided in half to form said left plane and said right plane.

9. The screen system of claim 1, wherein said plurality of projectors are arranged in multiple tiers with adjacent projectors being on neighboring tiers, and the lens aperture of adjacent projectors on neighboring tiers being offset so that a first edge of the aperture of each projector aligns with the corresponding opposite edge of the aperture of its adjacent projector.

10. The screen system of claim 5,
wherein said plurality of projectors are arranged in multiple tiers with adjacent projectors being on neighboring tiers, and the lens aperture of adjacent projectors on neighboring tiers being offset so that a first edge of the aperture of each projector aligns with the corresponding opposite edge of the aperture of its adjacent projector.

11. The screen system of claim 10, wherein said projectors are arranged in two tiers in a zig-zag arrangement.

12. The screen system of claim 10, wherein said projectors are arranged in more than two tiers.

* * * * *